United States Patent [19]

Nakamura et al.

[11] Patent Number: 4,727,431
[45] Date of Patent: Feb. 23, 1988

[54] ELECTRONIC PRINT BOARD

[75] Inventors: Fumio Nakamura; Hiroyuki Kano, both of Tokyo, Japan

[73] Assignee: Oki Electric Industry Co., Ltd., Minato, Japan

[21] Appl. No.: 768,819

[22] Filed: Aug. 23, 1985

[30] Foreign Application Priority Data

Aug. 29, 1984 [JP] Japan ................. 59-178468

[51] Int. Cl.$^4$ ............................. H04M 1/10
[52] U.S. Cl. .................... 358/293; 358/294; 358/285
[58] Field of Search ............... 358/256, 293, 294, 93, 358/238; 434/428, 430, 429, 411; 178/18, 19; 179/274, 18 BC

[56] References Cited

U.S. PATENT DOCUMENTS 4,125,743 11/1978 O'Boyle et al. .............. 178/018
4,587,568 5/1986 Takayama ................... 358/293
4,591,904 5/1986 Urabe et al. ................. 358/75

OTHER PUBLICATIONS

G. P. Torok, "Electronic Blackboard Have Chalk Will Travel", Conf. 1977 International Conf. on Comm., 12-15, Jun. 1977.
Kawara Ban Issued by Oke Electric Industries Co. Ltd. Fijitsu, Facom 2260 OA Board System Fujitsu Ltd. vol. 35, No. 2, pp. 191-197, date 4-16-84.

Primary Examiner—Edward L. Coles, Sr.
Attorney, Agent, or Firm—Wenderoth, Lind & Ponack

[57] ABSTRACT

An electronic print board comprising: a recording medium formed by a flexible sheet for recording erasable recordings and/or drawings or for holding a data sheet thereon, a mechanism for moving said recording medium, a scanning system for scanning the writings and/or drawings or data carried on a data sheet secured on the recording medium and providing electric signals corresponding to the writings and/or drawings or the data, operating unit including sheet size selecting switches, an image memory for storing data corresponding to the writings and/or drawings or the data carried on a data sheet secured on the recording medium. A control circuit for controlling the scanning operation of the scanning system, reading data from the image memory and printing the data on a printing sheet, and a reading and printing unit for reading data from the image memory and printing the data read from the image memory under the control of the control circuit. The electronic print board is capable of scanning the entire area of the surface of the recording medium or only a limited area of the same corresponding to a size of sheet selected, of printing the data corresponding the entire area of the recording medium or only the data within a limited area corresponding to a size of a data sheet selected by means of one of the sheet size selecting switches, and of producing one copy or a plurality of copies of the same data.

2 Claims, 6 Drawing Figures

ELECTRONIC PRINT BOARD

BACKGROUND OF THE INVENTION

1. Field of the invention:

The present invention relates to an electronic print board capable of copying writings and drawings written and drawn on a blackboard to be used for conferences or meetings.

2. Prior Art:

An electronic print board of the prior art is disclosed in U.S. Pat. No. 4,587,568.

Generally, an electronic print board is used for conferences and meetings and is capable of producing copies of writings and drawings put down on a blackboard in a reduced size, and hence the copies are distributed on the spot to the participants.

Accordingly, the attendants need not note what has been put down on the blackboard, or the clerks of the conference or the meeting need not make and distribute copies of the record afterward. Thus the electronic print board is useful for the improvement of meetings.

In conferences, meetings and sessions employing such a conventional electronic print board, the attendants need not note the information put down on the blackboard, such as matters agreed upon, matters decided and/or drawings, and the clerks of the meeting need not record the same and distribute the copies of the record to the attendants, which is extremely convenient. However, as regards materials brought by the attendants, the attendants are required to bring the necessary number of copies of the materials which have been printed or copied beforehand.

SUMMARY OF THE INVENTION

Accordingly, it is an object of the present invention to provide a novel method of electronic print board utilization.

It is another object of the present invention to provide an electronic print board having improved functions.

It is a further object of the present invention to provide an electronic print board capable of copying materials brought by the attendants of a meeting or the like, ordinarily, information such as writings and drawings put down on paper sheets, on the spot.

According to the present invention, needless to say, writings and drawings put down on a recording medium of an electronic print board can be copied and, furthermore, materials, namely, writings and drawings, recordedon sheets brought by the attendants of a meeting can be copied by putting the sheets on an electronic print board.

Accordingly, an electronic print board enables a meeting to be carried on smoothly.

DESCRIPTION OF THE PREFERRED EMBODIMENT

Figure 1:
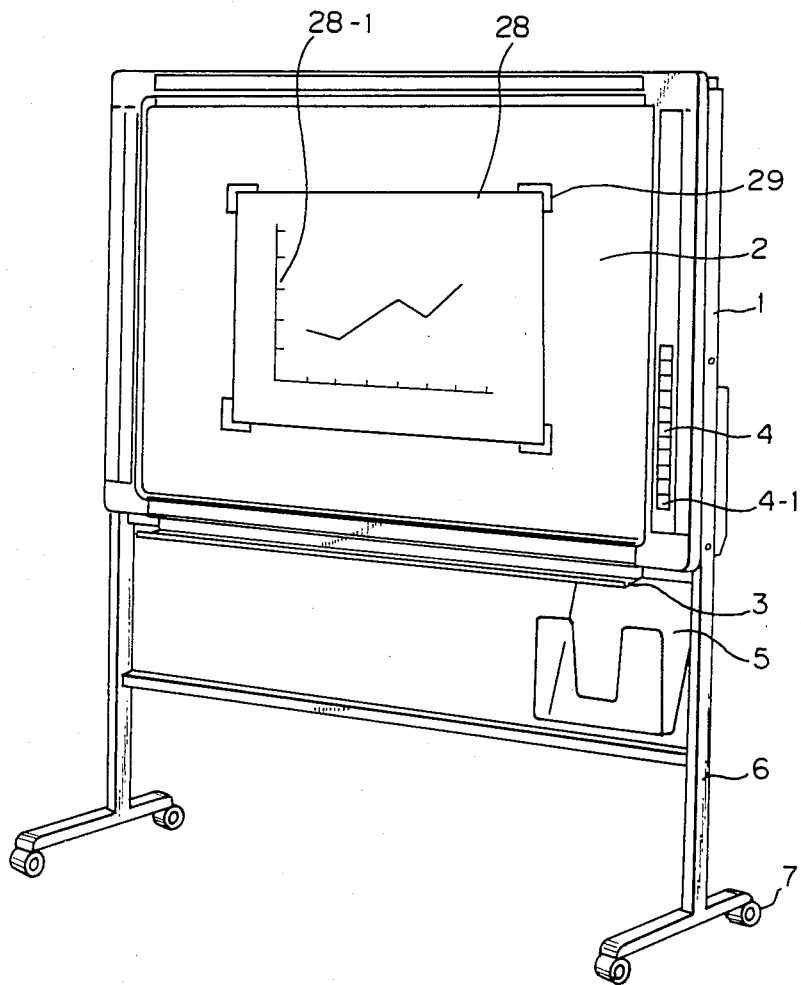
FIG. 1 is an external perspective view of an electronic print board according to the present invention in use.
Figure 2:
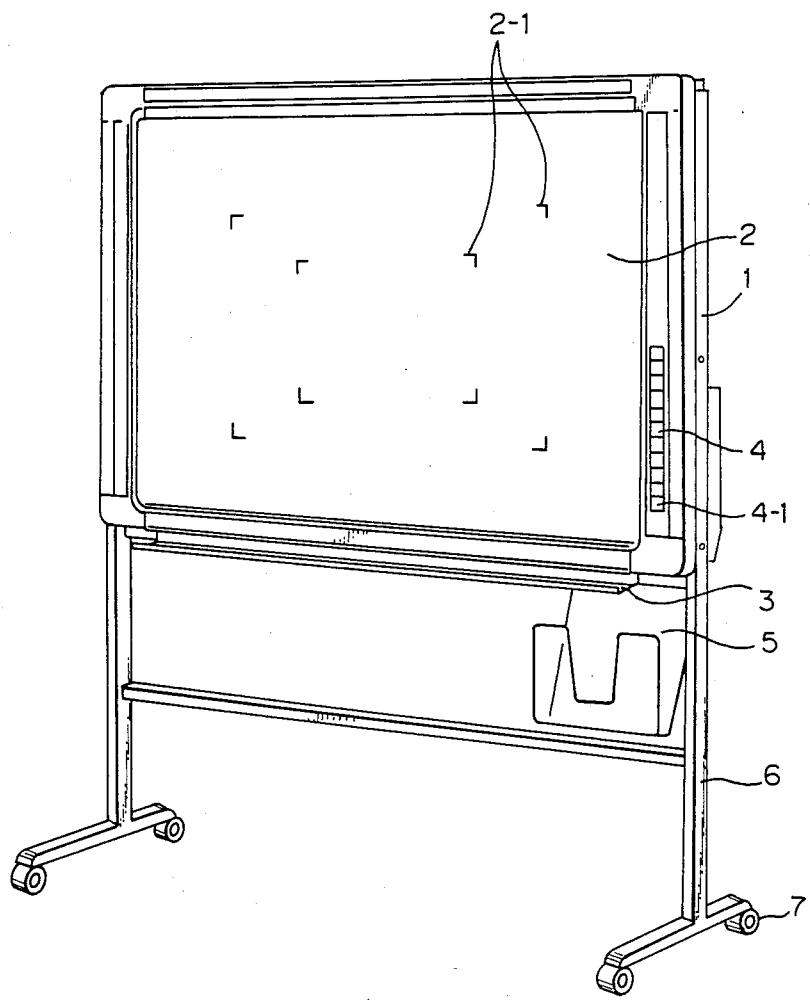
FIG. 2 is an external perspective view of an electronic print board according to the present invention.

FIG. 1 is an external perspective view of an electronic copy board in use, and FIG. 2 is an external perspective view of an electronic print board. In FIGS. 1 and 2, indicated at 1 is a case and at 2 is a recording medium on which writings and drawings can directly be put down. The recording medium 2 is formed by a large, flexible material and is capable of being moved laterally. Suitable materials for forming the recording medium are metallic materials, inorganic nonmetallic materials, and organic nonmetallic materials (Mylar, fluororesin films). Writings and drawings put down on the surface of the recording medium with an aqueous felt pen or the like can be erased with a wiping cloth or the like for the repeated use of the recording medium. Ordinarily, the size of the recording area of the recording medium is 920 mm long and 1300 mm broad. Indicated at 2-1 are marks put down on the recording medium 2 to define predetermined sheet sizes, for example, A0 and A1 specified in Japanese Industrial Standards. In FIGS. 1 and 2, there are also illustrated a concave tray 3 for holding writing media, an operating unit 4, a printing sheet receptacle 5 for receiving printed copying sheets carrying the writing and/or drawings put down on the recording medium and printed thereon by means of printing means, not shown, legs 6, and casters 7.

Figure 3:
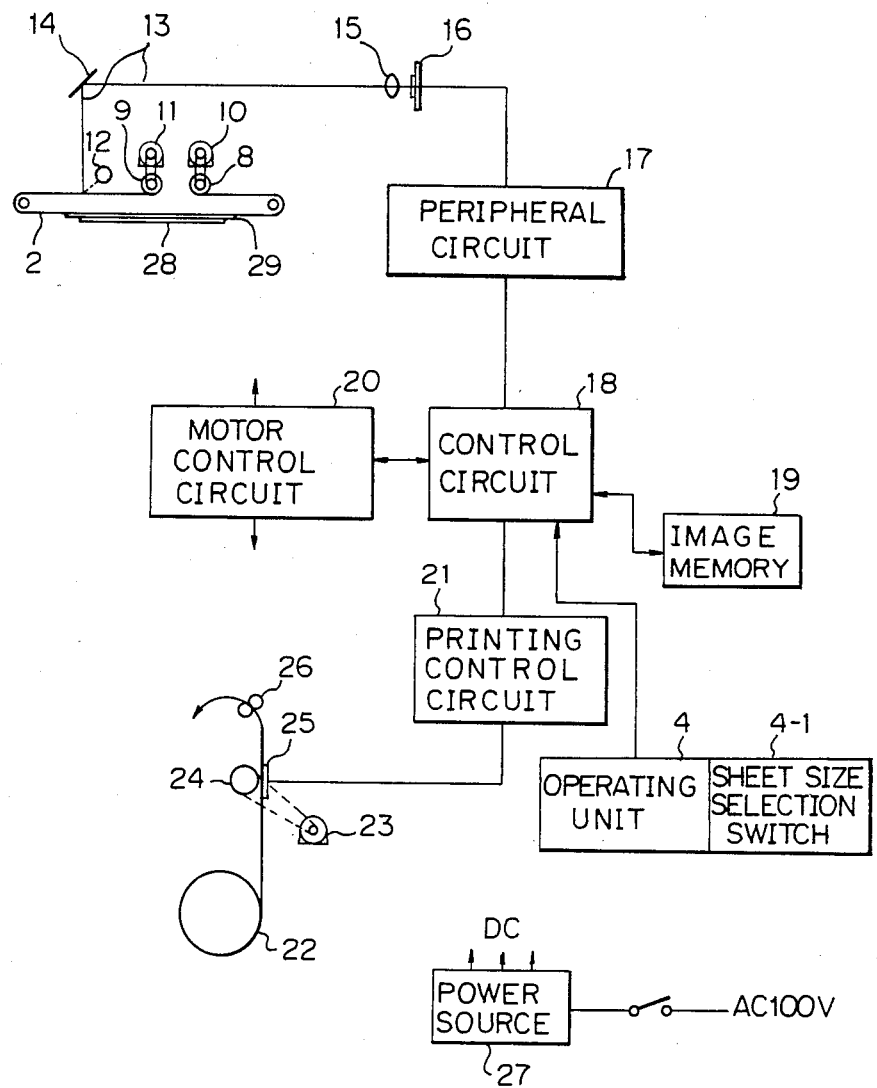
FIG. 3 is a block diagram for assistance in explaining the functions of the electronic print board of FIG. 1.

FIG. 3 is a block diagram for assistance in explaining the functions of the electronic print board. In FIG. 3, there are shown a recording medium feeding drum 8, a recording medium winding drum 9, motors 10 and 11, a light source 12 (a fluorescent lamp), a light flux 13, a mirror 14, a lens 15, a light-receiving element 16, a peripheral circuit 17 associated with the light-receiving element 16, a control circuit 18, an image memory 19, a motor control circuit 20, a printing control circuit 21, printing sheets 22, a printing sheet feed motor 23, a platen 24, a printing head 25 (a thermal head), a roller 26, a power source 27, a sheet 28 brought by the attendant of the meeting or by a user of the electronic print board and carrying characters, patterns and/or graphs 28-1 printed thereon beforehand, and sheet holding means 29, such as an adhesive tape, for attaching the sheet 28 to the recording medium 2.

In a conference, a meeting or a session employing the electronic print board of FIG. 1 ordinarily, the sheet 28 and the sheet holding means 29 are removed from the recording medium 2, and writings and drawings are put down on the recording medium 2. If necessary, the matters recorded on the recording medium 2 are copied and the copies are distributed to the attendants. In case materials brought by the attendants need to be displayed during the meeting, the sheet holding means 29 are disposed suitably at positions corresponding to the size of a sheet carrying the materials, with reference to the marks 2-1, and then the sheet is put on the sheet holding means 29. The sheet holding means 29 may be printed like the marks 2-1 on the recording medium 2 and/or the case 1 at positions corresponding to sheet sizes.

Figure 4:
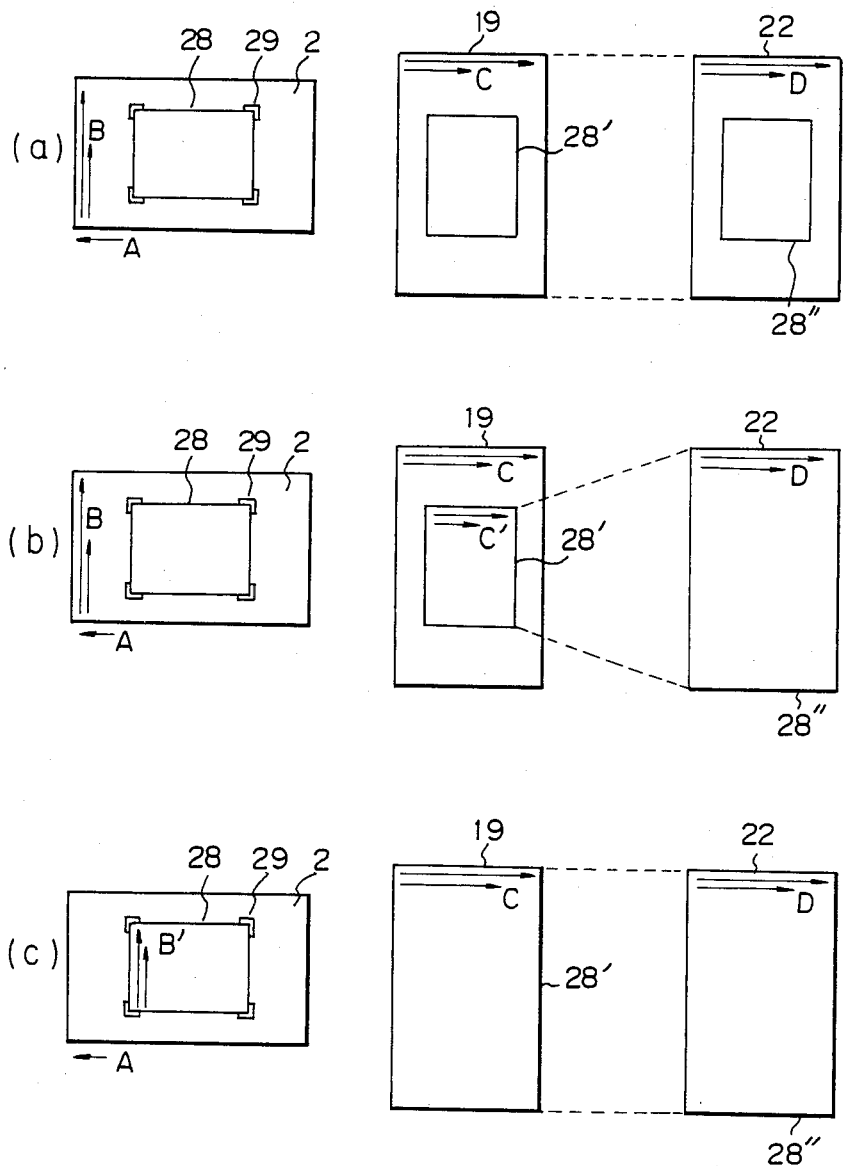
FIG. 4(a), 4(b) 4(c) are diagrams illustrating the conception of a printing method.

FIGS. 4(a), 4(b) and 4(c) are explanatory views illustrating the conception of printing methods according to the present invention in the relation between the recording medium 2, and the contents of the image memory 19 and the mode of printing data on the printing sheet 22.

FIG. 4(a) illustrates a first printing method. The light-receiving element 16 (FIG. 3) starts scanning the matters to be printed in a direction indicated by an arrow B as the recording medium 2 is moved in a direction indicated by an arrow A. After the completion of scanning of one line, the next line is scanned. Thus the matters to be printed are scanned sequentially line by line. The matters thus scanned are written in the image memory 19 in a direction indicated by an arrow C, under the control of the control circuit 18 (FIG. 3). Upon the completion of the scanning operation and the writing operation to store the matters put down in one frame in the image memory 19, the matters, namely, the writings and drawings recorded on the sheet 28, are stored in the image memory 19 as indicated at 28' in FIG. 4(a). In copying the contents of the image memory 19, the contents of the image memory 19 are read along the direction indicated by the arrow C under the control of the printing control circuit 21 (FIG. 3). The data thus read from the image memory 19 is recorded in a printing sheet 22 line by line along a direction indicated by an arrow D. Thus the writings and drawings of the sheet 28 are recorded as indicated at 28" in FIG. 4(a) in hard copy after the completion of the recording of data recorded in one frame.

FIG. 4(b) illustrates a second printing method according to the present invention. In the second printing method, the writings and drawings recorded on the sheet 28 are stored in the image memory 19 in the same manner as that of the first printing method, and hence the description the procedure for storing the writings and drawings recorded on the sheet 28 in the image memory 19 will be omitted. The writings and drawings recorded on the sheet 28 are stored in the image memory 19 in a mode as indicated at 28' in FIG. 4(b). In producing a copy of those writings and drawings, the contents of the image memory 19 are read along a direction indicated at C' under the control of the control circuit 18 (FIG. 3). In reading the contents of the image memory 19, the contents stored in a storage area corresponding to a sheet specified by means of a sheet size selection switch 4-1 (FIG. 3) are read. The data thus read from the image memory 19 is recorded on a printing sheet 22 line by line along the direction indicated by the arrow D. Thus the writings and drawings of the sheet 28 are recorded as indicated at 28" in FIG. 4(b) in hard copy after the completion of the recording of data recorded in one frame. According to the second printing method, only the matters recorded within the sheet 28 are copied, which is different from the mode of copying according to the first printing method.

FIG. 4(c) illustrates a third printing method according to the present invention. The third printing method is similar to the second printing method, in which only the matters recorded within the sheet 28 are copied.

As the recording medium 2 is moved in a direction indicated by an arrow A, the light-receiving element 16 (FIG. 3) starts a scanning operation. However, the control circuit 18 inhibits simultaneous storage of the data in the image memory 19. The control circuit 18 controls the writing operation so that writing operation is executed only when the scanning operation is performed along a direction indicated by an arrow B' in FIG. 4(c), namely, only when the scanning position is within the sheet 28. Thus only the information within the sheet 28 is written in the image memory 19. In this scanning operation, signals of the information recorded within an area corresponding to a sheet specified by means of a sheet size selection switch 4-1 (FIG. 3) is written in the image memory 19. Writing in the image memory 19 is carried out along a direction indicated by an arrow C in FIG. 4(c). In copying the contents of the image memory 19, the same is read from the image memory 19 along the direction indicated by the arrow C under the control of the printing control circuit 21 (FIG. 3). The data thus read from the image memory 19 is recorded on a printing sheet 22 along a direction indicated by an arrow D. Thus the writings and drawings of the sheet 28 are recorded as indicated at 28" in FIG. 4(c) in hard copy after the completion of the reading of data recorded in one frame.

The reading operation and the printing operation according to the present invention will be described with reference to Fig. 3.

First a sheet size (for example, A0, A1 or the like specified in Japanese Industrial Standards) of the sheet 28 is specified by operating the corresponding sheet size selection switch 4-1 of the operating unit 4, and then a copy switch is depressed. Then, the motor control circuit 20 is actuated to drive the motors 10 and 11 so that the recording medium 2 is unwound from the feed drum 8 and wound on the winding drum 9. The writing and drawings recorded on the recording medium 2 are illuminated by the light source 12 immediately before the corresponding portion of the recording medium 2 is wound on the winding drum 9. The reflected light is projected through the mirror 14 and the lens 15 on the light-receiving element 16. The light signals corresponding to the images of the writings and the drawings projected on the light-receiving element 16 are converted into electric signals, and then the electric signals are transmitted to the control circuit 18. The control circuit 18 controls the reading operation so that the data recorded outside an area corresponding to the specified sheet size is skipped, namely data recorded outside the sheet 28 is skipped. As the recording medium 2 is wound gradually on the winding drum 9 and the reading of the data within the range of the sheet 28 is started, the printing sheet feed motor is started and the printing signals corresponding to the data recorded within the range of the sheet 28 are supplied sequentially to the printing head 25 to print the data red from the sheet 28 on a printing sheet 22. Simultaneously, the printing signals are stored in the image memory 19.

When a plurality of copies of the same contents are required, the image data stored in the image memory 19 is read under the control of the control circuit 18 to produce a plurality of the same copies.

While the invention has been particularly shown and described with reference to the preferred embodiments thereof, it will be obvious to those skilled in the art that the foregoing and other changes in form and details can be made therein without departing from the spirit and scope of the invention.

What is claimed is:

1. An electronic print board for use in conferences and meetings to scale down and copy characters and figures written thereon, comprising:
   (a) a housing;
   (b) a driving roller and a supporting roller rotably mounted on said housing;
   (c) a writing medium of a predetermined size disposed between said driving roller and said supporting roller and supported movably by driving said driving roller, said writing medium permitting characters and figures to be written thereon and erased therefrom;

(d) a mark printed on said writing medium for indicating a position of affixing on said writing medium of a document of a prescribed size having characters and figures previously written thereon;

(e) means for affixing said document on said writing medium;

(f) a copy button for instructing said electronic print board to copy when manually operated;

(g) a means, including a light source and a lens, for reflecting light from said light source off of said writing medium and said document and through said lens to form a reduced scale image of a combined picture image of said writing medium and said document by moving said writing medium and said document to a position where said light from said light source is reflected, said writing medium and document being moved with the aid of said driving roller when said copy button has been manually operated;

(h) a readout sensor, disposed so as to receive said reduced scale image, said sensor including a means for providing an electrical signal containing read data which is responsive to said reduced scale image;

(i) an operating means for designating a size of a document to be affixed on the writing medium;

(j) a control circuit for receiving said electrical signal from said readout sensor and for supplying read data falling within a range of said size of said document designated by said operating means;

(k) an image memory for writing only an image of said document by receiving said read data on the basis of instructions from said operating means, and for supplying said written data to a printing unit; and (l) a printing head for converting data stored in said image memory into corresponding pattern signals and for printing a pattern corresponding to said pattern signals thereby scaling down and copying only characters and figures on said document affixed on said writing medium.

2. An electronic print board according to claim 1, wherein said mark for indicating the affixing position is printed on the writing medium such that a single document is affixed on the writing medium.

* * * * *